CONTINUOUS SELECTIVE READOUT FOR MAGNETIC CORE SYSTEMS

Filed Dec. 19, 1963 Sheet 1 of 2

INVENTOR.
EDWARD C. DOWLING
BY

Curtis, Morris & Safford

CONTINUOUS SELECTIVE READOUT FOR MAGNETIC CORE SYSTEMS

Filed Dec. 19, 1963

INVENTOR.
EDWARD C. DOWLING
BY
Curtis, Morris & Safford

United States Patent Office 3,426,334
Patented Feb. 4, 1969

3,426,334
CONTINUOUS SELECTIVE READOUT FOR MAGNETIC CORE SYSTEMS

Edward Camp Dowling, Harrisburg, Pa., assignor to AMP Incorporated, Harrisburg, Pa.

Filed Dec. 19, 1963, Ser. No. 331,761
U.S. Cl. 340—174 10 Claims
Int. Cl. G11b 5/00

ABSTRACT OF THE DISCLOSURE

Selective readout for magnetic core systems which comprises at least one row of shift register means each including an arrangement of magnetic core means having even and odd magnetic core members connected in a shifting sequence. Readout circuit means is operatively connected to each of one of the even and odd magnetic core members in each shift register means and utilization circuit means is connected to the readout circuit means. Drive circuit means is operatively connected to each one of the even and odd magnetic core members that contains the readout circuit means. Switch means is connected between the drive circuit means and the shift register means to select one thereof to continuously readout the information therefrom to the utilization circuit means.

This invention relates to a selective readout means for a storage system having magnetic core systems.

Heretofore, the information stored in the final magnetic core system is connected to a utilization device, such as, an indicating device which indicated the information that had been transferred or shifted through aligned magnetic core systems. At times during the transferring of information through the aligned magnetic core systems, it is desirable to readout information in a particular row of magnetic core systems prior to the information reaching the final row.

It is, therefore, a primary object of the present invention to provide a selective readout means capable of reading out stored information prior to reaching the final magnetic core system.

Another object of the present invention is the provision of a selective readout means to readout information stored at any position within a series of magnetic core systems.

A further object of the present invention is to provide a selective readout means which is simple, reliable and inexpensive.

An additional object of the present invention is to provide the nondestructive, interference-free readout of information from successive magnetic core systems.

In U.S. Patent 2,995,731, there is disclosed a shift register comprising a number of multiaperture magnetic cores (MAD's) and connecting wire only. The cores are divided into even and odd groups and connected in sequence, a core of one group being able to transmit a binary one or zero to the next core in the other group, and so on. To shift the binary information, which is stored in the form of magnetic flux, in one core to the next, the groups of cores are energized by drive currents applied in proper sequence to an advance odd to even (ADV O to E) winding, an advance even to odd (ADV E to O) winding, and a prime winding.

It is advantageous because of cost, size and circuit efficiency to use rather small MAD cores in a shift register such as described above. Typically, these cores are about the size of a shirt button. Now, because of the small size of the cores, their power handling capacity is quite limited. Generally speaking, with cores of this small size, it is impossible to obtain sufficient output current to actuate an information utilization device directly from a core using previously known readout techniques. This is made even more difficult where a number of information utilization devices are used, as for example in multi-core shift registers. Here some, none or all of the information utilization devices may be actuated depending upon the respective information status of the cores in the registers. Thus, a widely varying load is placed on the power supply for the information utilization devices. Previously, even though a given supply circuit had been able to actuate one or a few information utilization devices, there was undesirable variation in the information utilization devices, as more and more were turned on or off. Thus, as a practical matter, such an information utilization arrangement, such as a visual display arrangement has not heretofore been satisfactory.

In U.S. patent application Ser. No. 249,465, filed Jan. 4, 1963, and now U.S. Patent No. 3,344,413, there is disclosed a shift register wherein each odd core of a multicore MAD shift register is provided with a respective coupling to an information utilization device which is actuated and deactuated in accordance with whether the core is set with a one or a zero. Each information utilization device, when actuated, provides a substantially constant output regardless of how many or how few information utilization devices are actuated at a particular instant. A unique power supply or drive circuit for the information utilization devices provides continuous, nondestructive readout from a minor aperture of each core, and this is achieved without interfering with normal operation of the shift register. The power supply is designed to provide essentially constant current to a drive winding linking all of the minor readout apertures of the cores, the frequency, amplitude and waveform of this current being particularly chosen so that in relation to the size and material of the cores, they are most efficient in driving the respective information utilization devices coupled to them as well as providing normal operation of the circuit, as a shift register, without any affect thereon.

In accordance with the present invention in one specific embodiment thereof, each odd core of a multicore MAD shift register is provided with a respective coupling which is serially connected to corresponding couplings of cores in a succession of aligned shift registers and then to an information utilization device. A power supply is also coupled to each of the odd cores of the multicore of shift registers, and a switch means is provided between the power supply and each shift register to actuate one of the shift registers to provide an output to the information utilization device in order to utilize the information therein. One of the shift registers is constantly connected to the information utilization device via the switch means.

Figure 1:
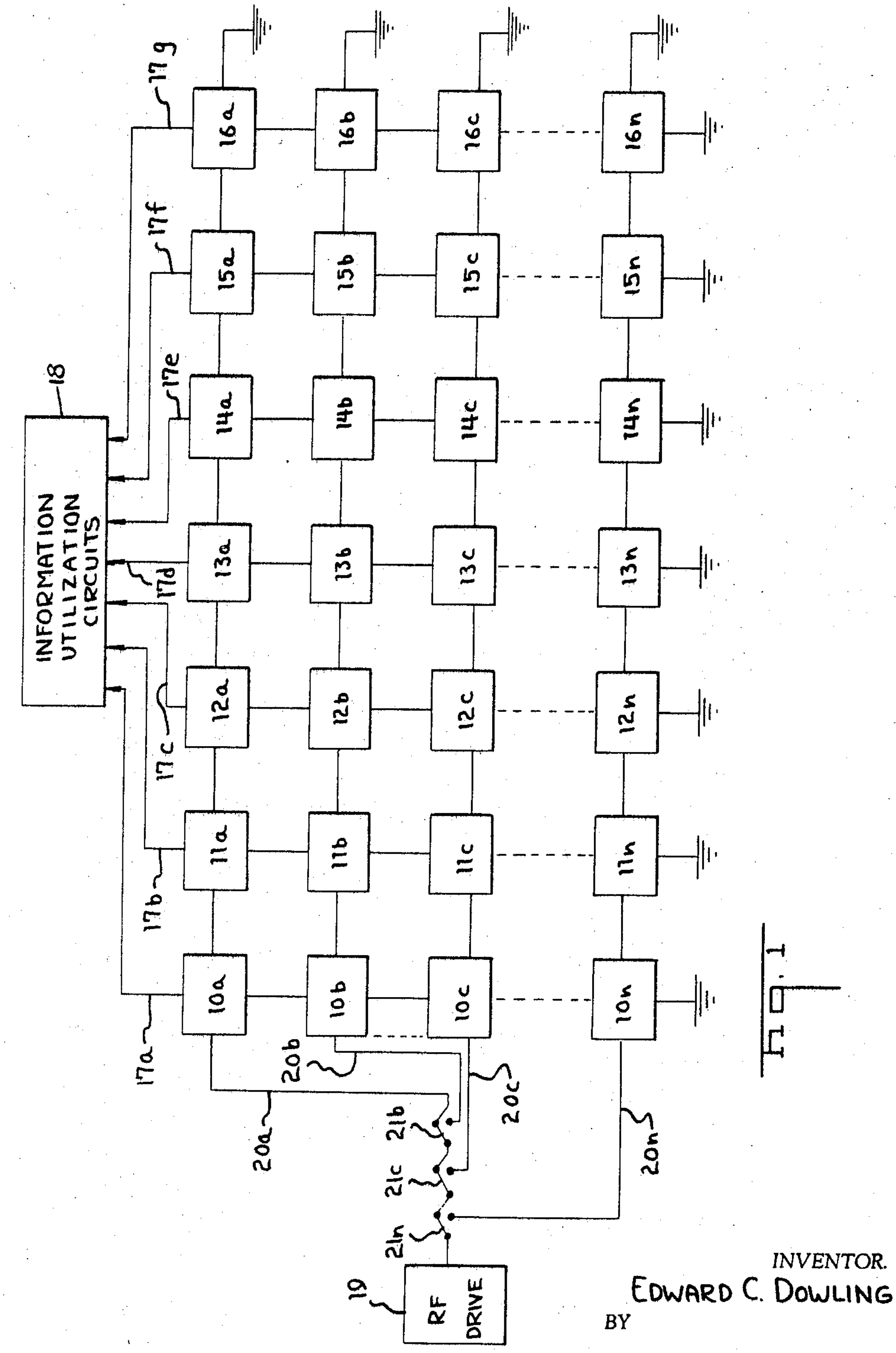
FIGURE 1 is a simplified presentation of an illustrative memory array according to the principles of this invention.

A conventional memory array comprising shift registers 10*a*, 10*b* . . . 10*n*; 11*a*, 11*b* . . . 11*n*; 16*a*, 16*b* . . . 16*n* is shown in FIGURE 1. Each vertically aligned row of shift registers has an information output circuit 17*a* . . . 17*g* connected to ground, in series to each shift register and to information utilization circuits 18 such as, an indication tube disclosed in U.S. Patent No. 2,268,441 or similar device for displaying or utilizing the information of the memory array. Each output circuit 17*a* . . . 17*g* includes circuit means coupled to each odd core in each shift register.

An RF drive circuit 19, similar to that disclosed in the above-mentioned patent application, is coupled to each odd core of each longitudinal row of shift registers by leads 20*a* . . . 20*n* via a switching means 21. Lead 20*a* is continuously connected through switching means 21 to RF drive 19 in order to provide continuous nondestructive readout from the final row of shift registers 10*a* . . . 16*a* via output circuits 17*a* . . . 17*g* to information utilization circuits 18.

Switching means 21 may take the form of single pole double throw switches 21*b*, 22*c* . . . 22*n* in order to select any corresponding horizontal row of shift registers other than 10*a* . . . 16*a* so that the output from RF drive 19 can be passed therethrough to readout the information presently therein via output circuits 17*a* . . . 17*g* to information utilization circuits 18.

Figure 2:
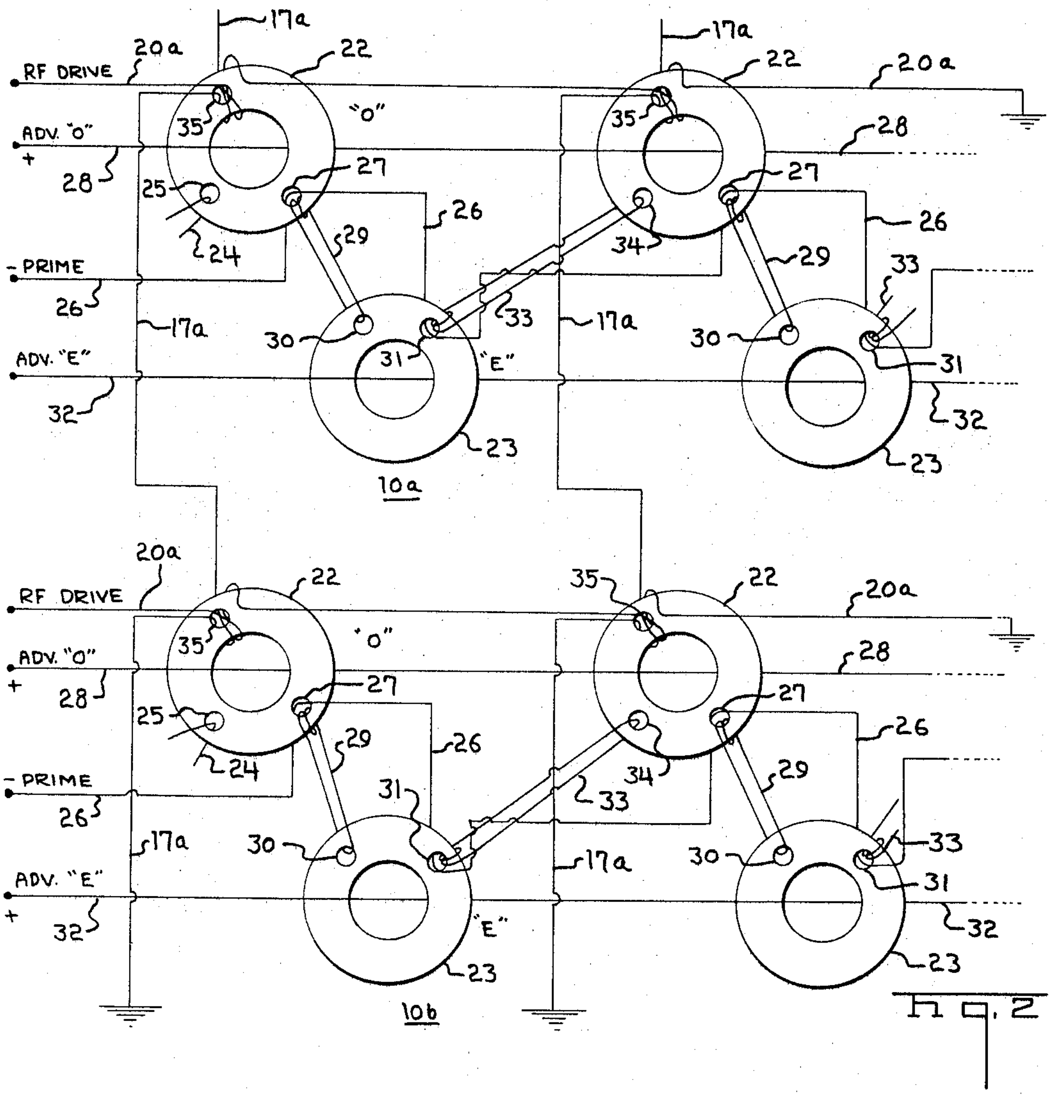
FIGURE 2 is a schematic diagram of MAD core shift registers wherein a readout winding is serially coupled to the odd-numbered cores of successive registers to give continuous readout signals in accordance with the invention.

The other conventional circuitry for shift registers such as, advance, prime, input, etc., have been omitted from FIGURE 1 for purposes of clarity but are schematically shown in FIGURE 2.

The magnetic core circuits 10*a* and 10*b* shown in FIGURE 2 include a number of MAD cores 22 and 23 which are arranged respectively, in a group of odd-numbered (O) cores and a group of even-numbered (E) cores as indicated. There may, for example, be ten odd and ten even cores in each register, but for simplicity only two in each register are shown.

Information, either a binary one or a binary zero, is fed into the first O core of each of the registers by means of input windings 24 threading minor input apertures 25 of the cores. When the cores are saturated with flux in the clockwise direction, they are said to be set with a zero; when the cores are saturated partly in the clockwise and partly in the counterclockwise direction, they are said to be set with a one. Thereafter, by application of suitable currents in the proper sequences to prime windings 26 threading minor output apertures 27 of the first odd cores (as well as the others in each register), and to advance O to E windings 28 threading the major apertures of the O cores of each register, information stored in an odd core is transferred to the next E core. The minor output apertures 27 of each O core is threaded by respective coupling windings 29 which also threads minor input apertures 30 of the next E cores 23. Information transferred to an E core is similarly shifted in turn to the next O core by currents applied to prime windings 26 linking minor output apertures 31 of the E cores, and to advance E to O windings 32 through the major apertures of the E cores. Each E core of each register is connected to the next O core by respective coupling windings 33 threading apertures 31 of the E cores and minor input apertures 34 of the O cores. A more detailed explanation of the operation of such a shift register will be found in the aforesaid U.S. patent.

Figure 3:
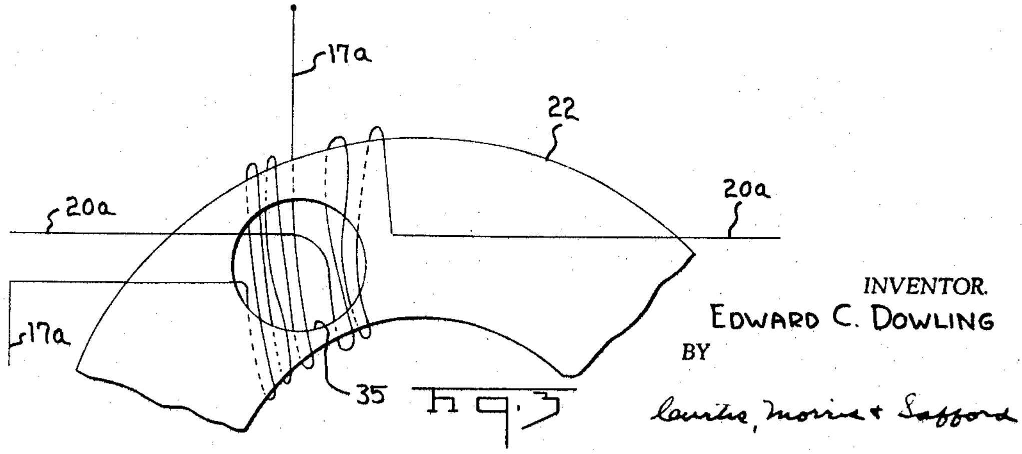
FIGURE 3 is a greatly enlarged detail of the readout drive and coupling windings at the readout aperture of a core.

Now, each O core 22 of circuits 10*a* and 10*b* is provided with a minor readout aperture 35 which, as seen, also in enlarged detail in FIGURE 3, is theaded in "figure-8" fashion by drive winding 20 and by a load winding 17. One end of the latter is either coupled to the information utilization circuits or a successive minor readout aperture 35 while the other end is coupled to a successive minor readout aperture. There is applied continuously to drive winding 20*a* a steady, sinusoidal current from RF drive unit 19. The current from the unit has a frequency sufficiently high so that the magnetic material of the core, when it is in a locally switchable state about aperture 35, will just complete switching as the current through winding 20*a* begins to reverse. A suitable frequency is, for example, 300 kilocycles. This gives higher efficiency in driving the information utilization circuits than would an appreciably lower frequency. It is also desirable to use a sine waveform, rather than a square wave, for example, since flux switching about aperture 35 will take place smoothly over each cycle.

When an O core is set with a binary one, there will be, for reasons known to the art, a flux locally switchable around a minor aperture of the core. In this event, the high frequency current flowing in drive winding 20*a* causes switching of flux locally around minor aperture 35 but not around the major aperture, nor around any other minor aperture of the core. This local switching of flux will induce a current in load winding 17*a* causing the information utilization circuit to be evenly actuated. When an O core is set with a zero, its respective information utilization circuit will not be turned on because no flux can be switched locally around aperture 35 and there is no magnetic coupling between windings 20*a* and 17*a*.

The evenness of current through a respective information utilization circuit when on, is essentially independent of how many or how few information utilization circuits are actuated at a given instant. This is accomplished by maintaining the current in drive winding 20*a* effectively constant regardless of the size of the load coupled to the winding. In the case of a forty bit register, this load can vary by over ten-to-one. To accommodate this variation, RF drive 19 is made to operate as a constant current source.

The operation of the shift register, as a shift register, is not affected by drive winding 20*a* and the information utilization circuits coupled to the O cores. Thus, during normal shift register operation, drive unit 19 can be left on. Stated differently, continuous readout from the O cores, without adverse interaction of the RF drive and load upon the shifting of information from one core to the next, is obtained throughout the entire array.

The drive and load winding configuration shown in FIGURE 3 insures that both legs of a core 22 at its minor aperture 35 will be properly driven by current in winding 20*a*. It is possible in the present circuit to use a different arrangement, for exammple, a single turn of wire through aperture 35 for winding 20*a* and a single turn for winding 17*a*. However, in this case the circuit will operate less efficiently and there will be some effect on the operation of the circuit as a shift register. For the particular winding arrangement shown in FIGURE 3, drive current on winding 20*a* is about half enough to switch flux around the major aperture of a core. With a core made of General Ceramincs type 5209 ferrite material, having a thickness of 0.060 inch, a major aperture of 0.240 inch and an outside diameter of 0.36 inch, 300 ma. peak to peak of sine wave current at 300 kc. on winding 20*a* is suitable for providing sufficient current to actuate desirable information utilization circuits.

As can be discerned, there has been disclosed a unique arrangement in which the information presently stored in any horizontal row of shift registers, namely, 10*b* . . . 16*b*, 10*c* . . . 16*c*, . . . 10*n* . . . 16*n*, can be continuously and nondestructively readout when any one of the switches of switch means 21 is actuated while one horizontal row of shift registers, namely, 10*a* . . . 16*a*, is always continuously and nondestructively readout.

The scheme as illustrated does not interfere with any type of transfer for information, to be serial-serial, serial-parallel, parallel-parallel or parallel-serial, such as desired, and more detailed explanation of these transfers of information will be found in U.S. patent application Ser. No. 200,983, filed June 8, 1962 and now U.S. Patent No. 3,215,994, and filed under the name of the present inventor.

While only seven shift registers are shown in each horizontal row, it is obvious that more or less shift registers can be provided.

It will, therefore, be appreciated that the aforementioned and other desirable objects have been achieved; however, it should be emphasized that the particular embodiments of the invention, which are shown and described herein, are intended as merely illustrative and not as restrictive of the invention.

I claim:

1. Selective readout for magnetic core systems comprising an arrangement of magnetic core means having even and odd magnetic core members connected to transfer intelligence in a separate, readout circuit means operatively connected to each of said even magnetic core members or each of said odd magnetic core members, drive circuit means operatively connected in parallel to all of the core members containing said readout circuit means, a separate utilization circuit means connected to said readout circuit means, and switch means connected between said drive circuit means and said magnetic core means to select one thereof to continuously readout the information therefrom to said utilization circuit means.

2. Selective readout according to claim 1 wherein said drive circuit means is an RF drive unit having a frequency of about 300 kc.

3. A magnetic memory array comprising horizontal rows of shift register means each including an arrangement of magnetic memory means having even and odd magnetic memory members connected in a shifting sequence, given members in different rows forming columns of members in said array, readout circuit means operatively connected to each of said even or each off said odd magnetic memory members in each shift register means in each of said rows within given members of a given column connected in series to a given readout circut means, drive circuit means operatively and separately connected to each row of the magnetic memory members containing said readout circuit means, switch means provided in said drive circuit means between said shift register means and said drive circuit means to select one of said rows to readout information therefrom, and utilization means for each column of members connected to said readout circuit means for a column of members to utilize the readout from the selected row of members.

4. A magnetic memory array according to claim 3 wherein said magnetic memory members comprise magnetic core members each having a major aperture and at least one minor readout aperture, said readout circuit means and drive circuit means are coupled to said minor readout aperture.

5. Selective readout for a magnetic memory array comprising a plurality of rows of shift register means each including an arrangement of magnetic core means having even and odd magnetic core members connected in a shifting sequence, each of the odd magnetic core members or each of the even magnetic core members having a readout minor aperture, readout circuit means serially coupled to each said readout minor aperture in each row of shift register means, drive circuit means serially coupled to each said readout minor aperture in each row of shift register means, a separate utilization circuit means connected to each said readout circuit means for given core members of said rows to utilize the information readout therefrom, and switch means in said drive circuit means to select a single row of shift register means out of which information is read.

6. Selective readout according to claim 5 wherein said drive circuit means has a frequency of about 300 kc., the current applied by said drive circuit means being substantially constant whether one or more of said magnetic core members are read out.

7. Selective readout for a magnetic memory array having a plurality of aligned shift register means each including an arrangement of magnetic core means connected in a shifting sequence, some of said magnetic core means in each plurality of register means having a minor readout aperture, readout circuit means serially coupled to the readout apertures in each of a given core means of the shift register means, drive circuit means serially coupled to the readout apertures in each shift register means, switch means in said drive circuit means to select an alignment of shift register means out of which information is read, and utilization circuit means connected to said readout circuit means to utilize the information thereof.

8. Selective readout according to claim 7 wherein the arrangement of magnetic core means includes odd and even magnetic core members, said odd magnetic core members having the readout apertures.

9. Selective readout according to claim 7 wherein said drive circuit means provides a sinusoidal signal of about 300 kc.

10. In a system for selective readout of a matrix of magnetic storage cores including at least two rows and two columns of cores, each row and column containing at least two cores, input means linking said cores to set or clear said cores in patterns to store intelligence therein, output means linking said cores with a separate output lead for each column of cores common to the cores of such column, drive means linking said cores with a separate drive lead for each row of cores common to the cores of such row and operable to provide a continuous output of the state of a core, a drive source and a switch operable to connect a selected drive lead to said drive source to drive each core of the selected row to provide a separate output from each core in each column of cores of the selected row representative of the intelligence stored in said selected row of cores.

References Cited

UNITED STATES PATENTS

| | | | |
|---|---|---|---|
| 3,189,531 | 6/1964 | Franck et al. | 340—174 |
| 3,156,905 | 11/1964 | Stram et al. | 340—174 |
| 2,936,446 | 5/1960 | Rosenberg | 340—174 |
| 2,851,677 | 9/1958 | Crooks | 340—174 |

JAMES W. MOFFITT, *Primary Examiner.*